June 4, 1935.   J. C. ZOLA   2,003,330
LAMINATED GLASS
Filed Feb. 17, 1934
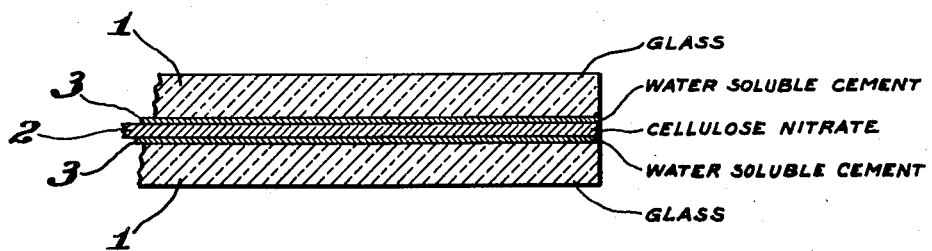
INVENTOR Patented June 4, 1935

2,003,330

UNITED STATES PATENT OFFICE 2,003,330

LAMINATED GLASS

John C. Zola, Tarentum, Pa., assignor to Duplate Corporation, a corporation of Delaware Application February 17, 1934, Serial No. 711,701

4 Claims. (Cl. 49—81)

The invention relates to laminated glass, and particularly to laminated glass in which cellulose nitrate plastic of a particular type is used as the reinforcing sheet. The adhesive used in order to cement the glass to ordinary cellulose nitrate plastic is in nearly all cases a water solution which comprises gelatin as its essential cementing agent. Another water soluble adhesive which forms a satisfactory cement is casein. These water soluble cements, and particularly the gelatin, are much superior to any other adhesives which have as yet been found for use with ordinary cellulose nitrate which contains camphor as its primary plasticizer, but when this plasticizer is displaced to a large extent, or entirely, plasticizers which are water repellent and give the plastics relatively high strength at low temperatures, such as dibutyl phthalate or diamyl phthalate, the gelatin and other water soluble adhesives lose their effectiveness as cements. This is apparently due to the fact that the plastic (having now a high moisture resistance) will not take up or absorb enough moisture from the adhesive to keep the films of such adhesive which are deposited on the glass in the sol state during the pressing operation. I have found that by incorporating with the gelatine or casein a small amount of certain of the high boiling solvents which are miscible with water, and at the same time, are compatible with the adhesive and have some solvent action on the plastic, the difficulty as to adhesion is overcome. In the drawing:

The figure is an enlarged sectional view through a laminated plate embodying the invention.

Referring to the drawing, 1, 1 are glass sheets, 2 is a sheet of cellulose nitrate plastic, and 3, 3 are coats or films of cement, such as gelatin or casein in which are incorporated the solvent which makes the adhesive effective with cellulose nitrate plastic having a large content of liquid plasticizer possessing the characteristics of low water solubility.

An example of a nitrocellulose formula having a large content of liquid plasticizer of low water solubility and low freezing point is as follows:

Cellulose nitrate _____ 50%
Dibutyl phthalate _____ 50%

Other plasticizers having similar properties which might be substituted in the above formula are dimethyl phthalate, diethyl phthalate, diamyl phthalate, triacetin, tricresyl phosphate and triphenyl phosphate. It will be understood that these plasticizers may be used alone or with other members of the group, and that the amount of plasticizer may vary within a considerable range. In all such cases, ordinary water soluble cements, such as gelatin and casein, lose most of their effectiveness in adhering the plastic to form safety glass, and the modified cement, as hereinafter described, provides a substitute which has all the holding power and effectiveness of gelatin when used with ordinary cellulose nitrate plastic.

The compounds which I have found effective to use with the gelatin or other water soluble cements in order to make them commercially satisfactory, when used with cellulose nitrate plasticized as above described, are one of the ethers derived from alcohols having three hydroxyl radicals. Two of such ethers which I have found most effective are diglyceryl ether and monoacetyl diglyceryl ether. A typical formula of the cement is as follows:

Gelatin _____ 3%
Water _____ 92%
Diglyceryl ether _____ 5%

The percentage of ingredients may be varied within a considerable range. The ether may be used in amounts ranging from .5% to 20% by volume of the solution. It will be understood that the monoacetyl diglyceryl ether may be substituted in the formula given for the diglyceryl ether using similar proportions.

In using the cement, the solution is preferably applied to the faces of the glass sheets in a very thin coating by a spraying operation similar to that commonly used in applying a gelatin solution to glass. After the cement coatings are dry to touch and sight, the sheets of glass and cellulose nitrate are assembled and laminated by the use of heat and pressure.

What I claim is:

1. A plate of laminated glass comprising a pair of glass sheets with an interposed sheet of plasticized cellulose nitrate which is water repellent and has high strength at low temperatures, and a layer of cement between the opposing faces of the glass and plastic sheets comprising a water soluble cement and a high boiling solvent from the group consisting of monoacetyl diglyceryl ether, and diglyceryl ether.

2. A plate of laminated glass comprising a pair of glass sheets with an interposed sheet of plasticized cellulose nitrate which is water repellent and has high strength at low temperatures, and a layer of cement between the opposing faces of the glass and plastic sheets comprising gelatin and a high boiling solvent from the group consisting of monacetyl diglyceryl ether and diglyceryl ether.

3. A plate of laminated glass comprising a pair of glass sheets with an interposed sheet of plasticized cellulose nitrate which is water repellent and has high strength at low temperatures, and a layer of cement between the opposing faces of the glass and plastic sheets comprising casein and a high boiling solvent from the group consisting of monoacetyl diglyceryl ether and diglyceryl ether.

4. A plate of laminated glass comprising a pair of glass sheets with an interposed sheet of cellulose nitrate plastic having a plasticizer of the group consisting of dimethyl phthalate, diethyl phthalate, dibutyl phthalate, diamyl phthalate, triacetin, tricresyl phosphate and triphenyl phosphate, and a layer of cement between the opposing faces of the glass and plastic sheets comprising a water soluble cement and a high boiling solvent from the group consisting of monoacetyl diglyceryl ether and diglyceryl ether.

JOHN C. ZOLA.